Nov. 3, 1931.   G. B. GRACE ET AL   1,830,024
MEAT BROILER
Filed May 31, 1927   7 Sheets-Sheet 5
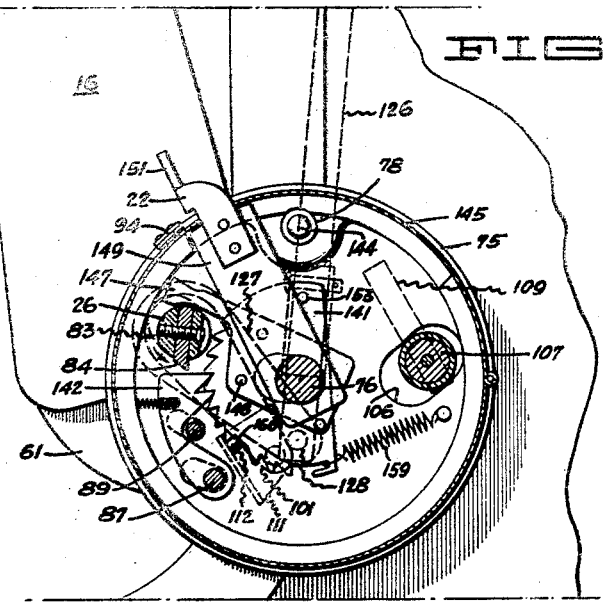
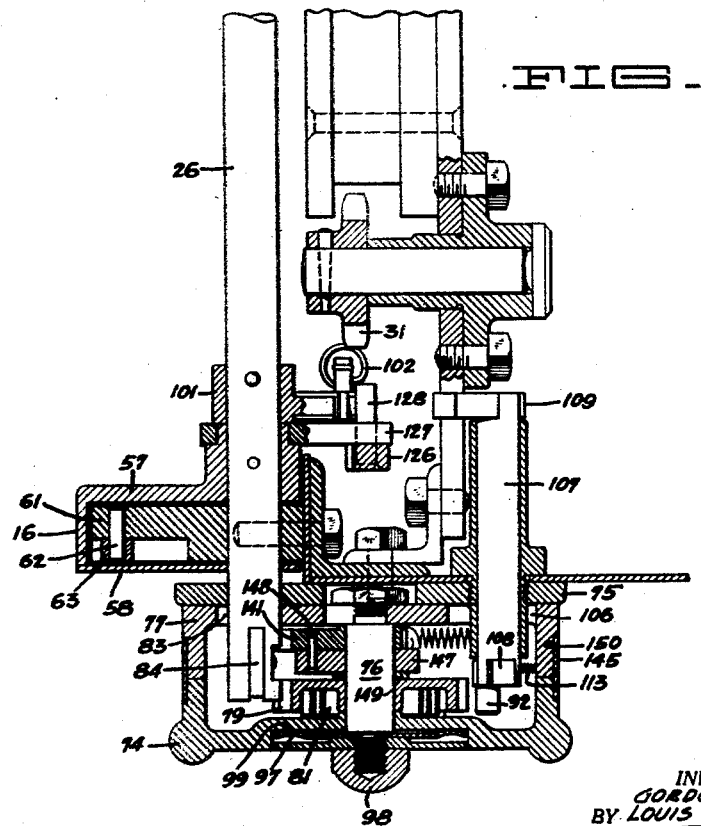
INVENTOR
GORDON B. GRACE
BY LOUIS P. LANSING
ATTORNEYS Nov. 3, 1931.    G. B. GRACE ET AL    1,830,024
MEAT BROILER
Filed May 31, 1927    7 Sheets-Sheet 6

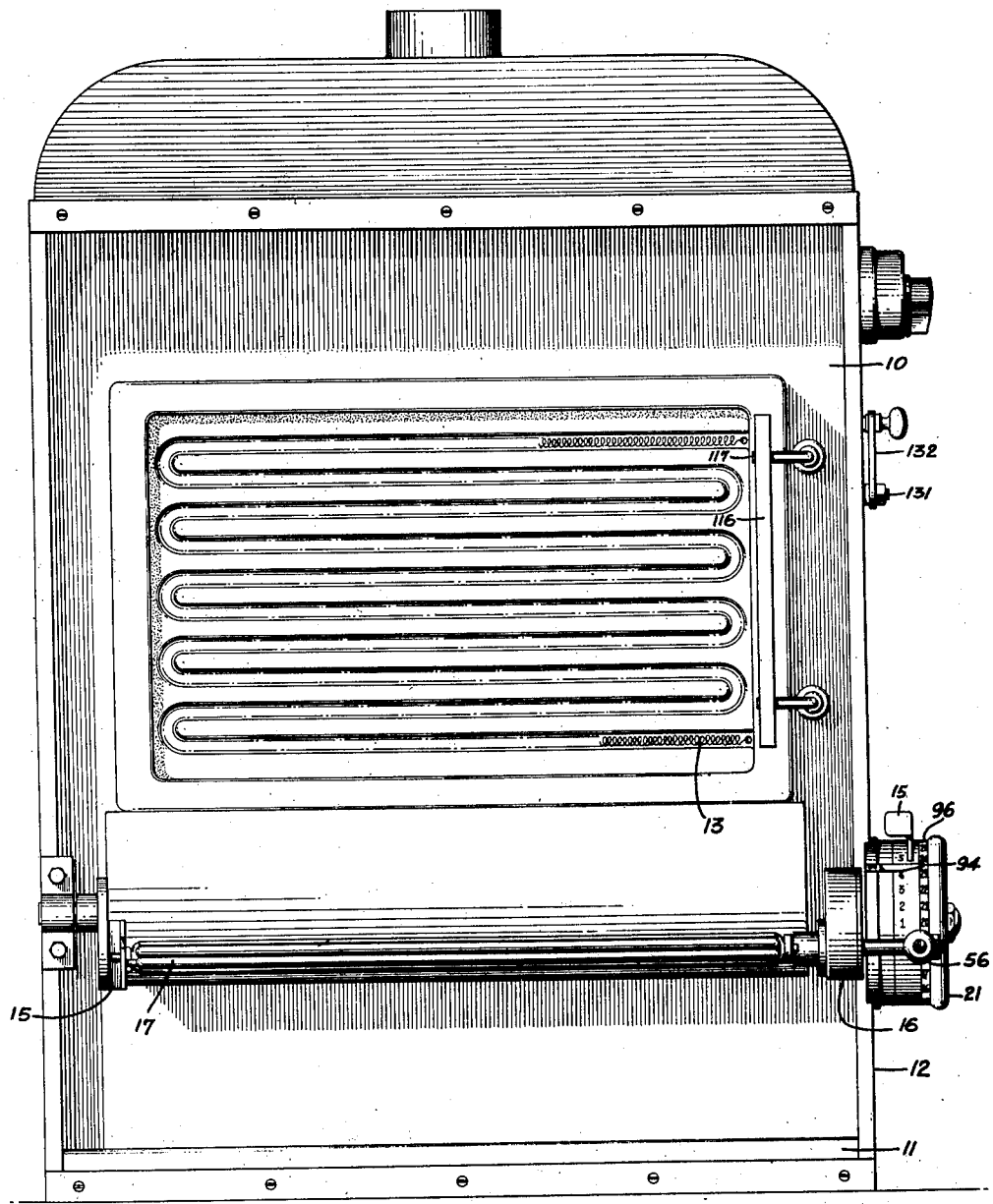

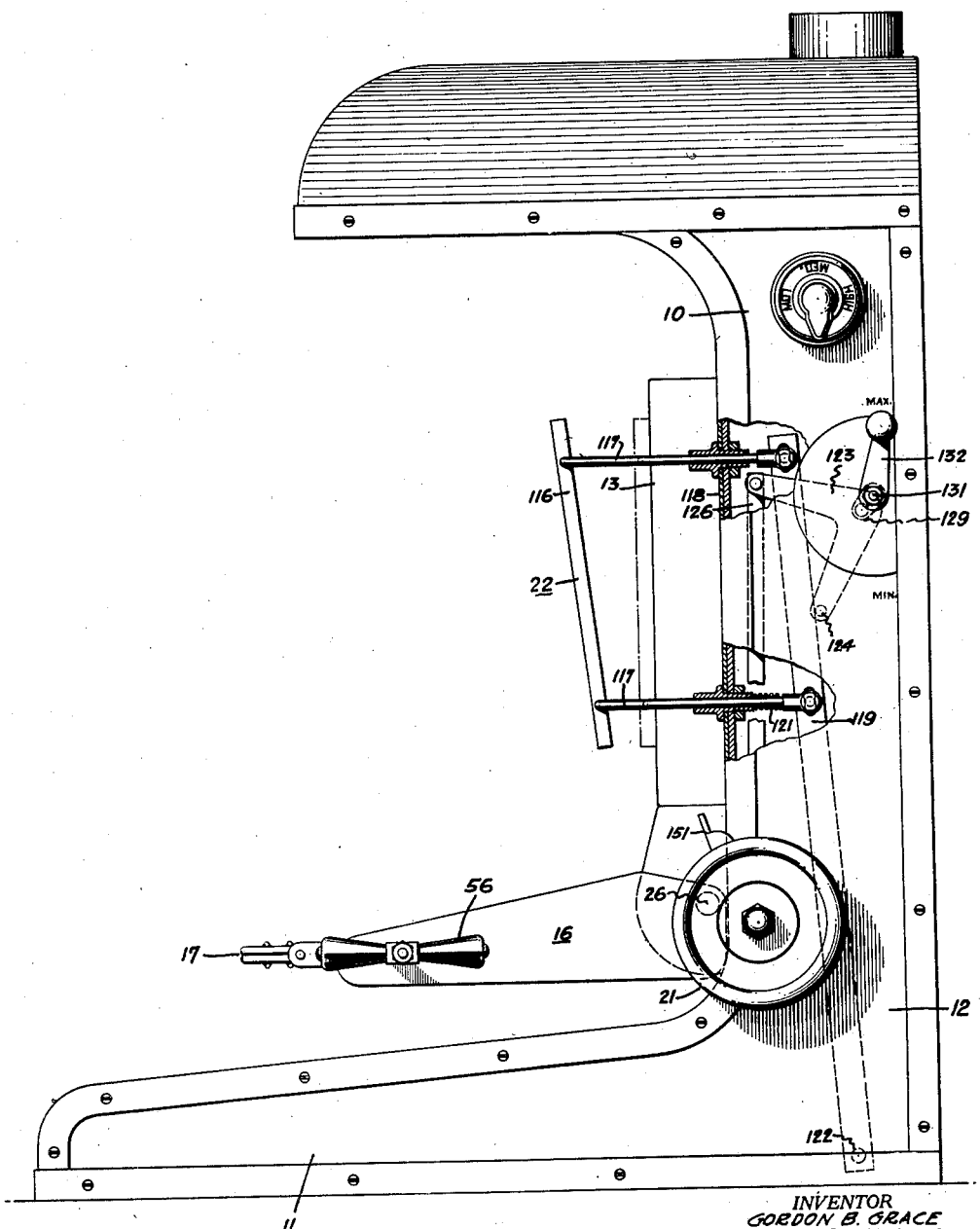

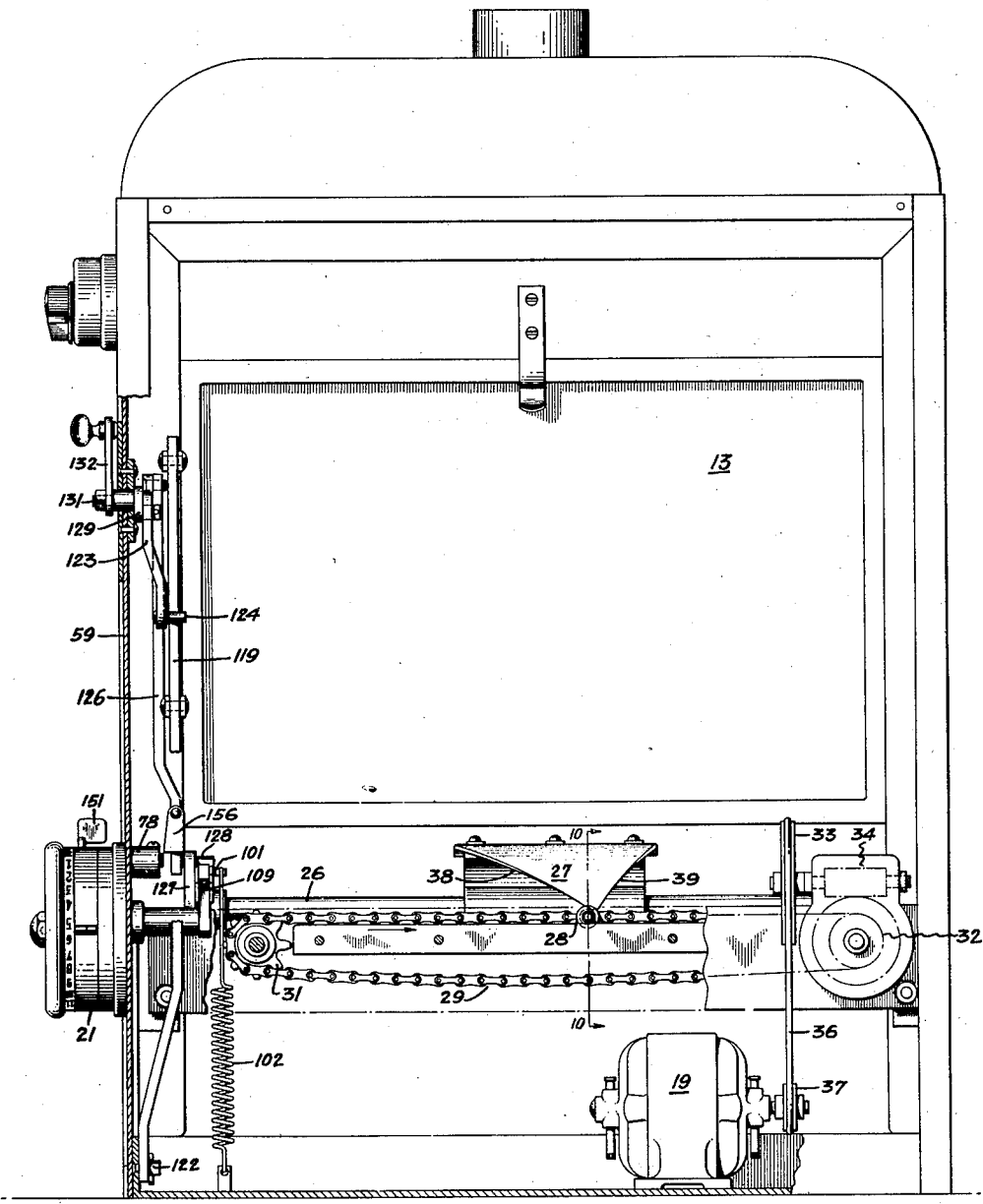

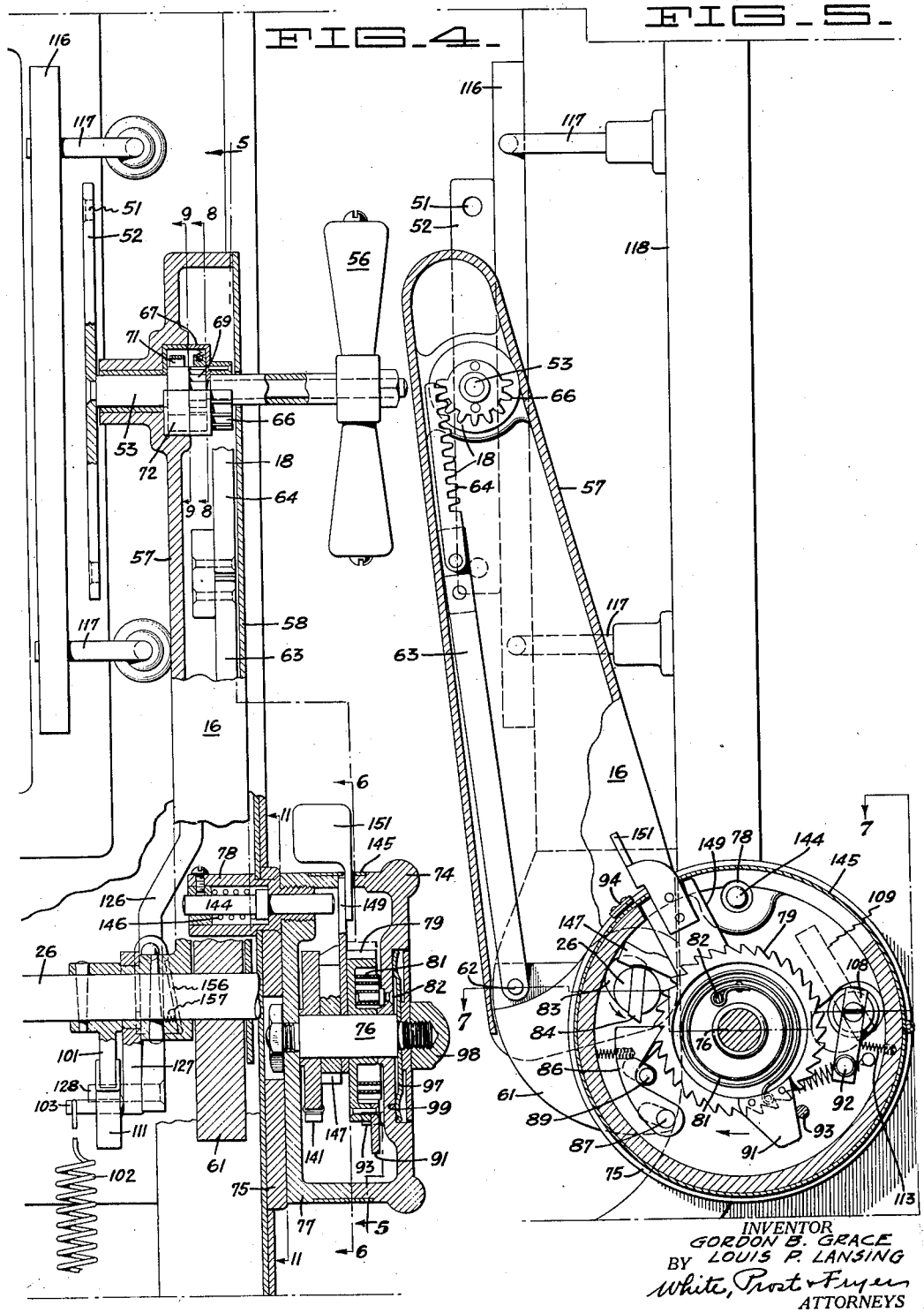

INVENTORS
GORDON B. GRACE
BY LOUIS P. LANSING
White, Prost & Fryer
ATTORNEYS

Nov. 3, 1931.  G. B. GRACE ET AL  1,830,024
MEAT BROILER
Filed May 31, 1927    7 Sheets-Sheet 7
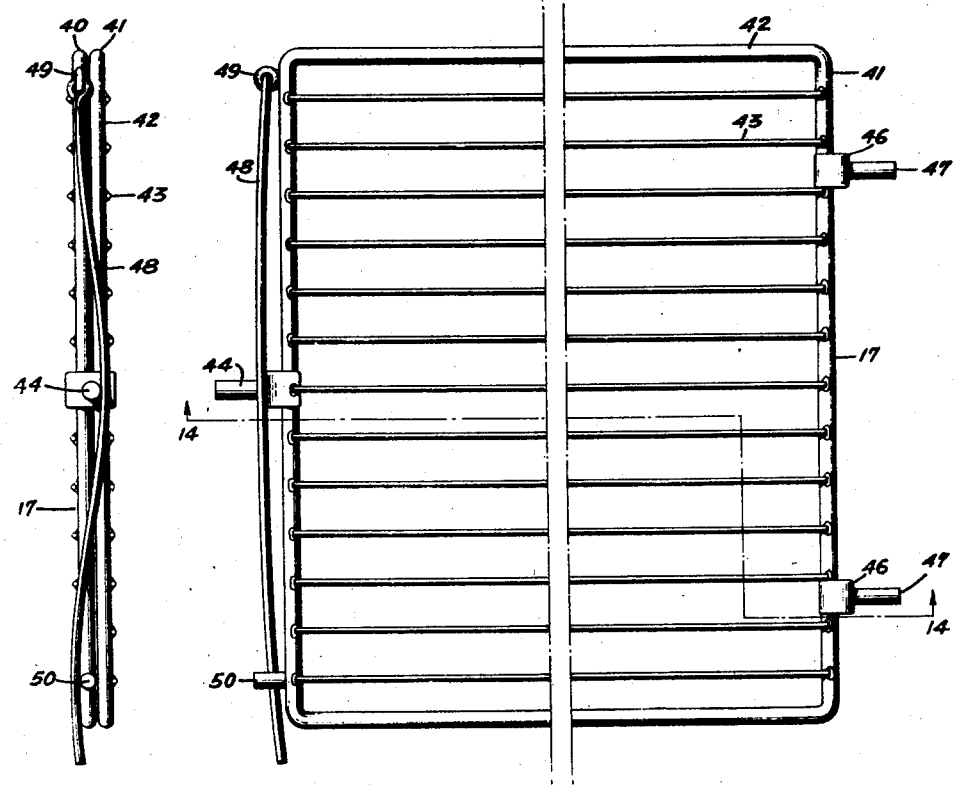
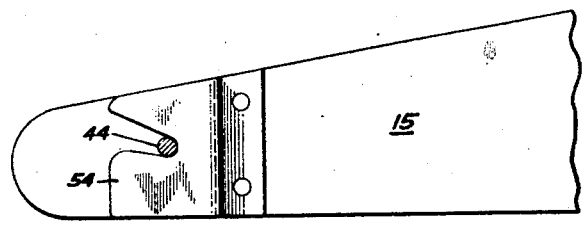
INVENTOR
GORDON B. GRACE
BY LOUIS P. LANSING
ATTORNEYS Patented Nov. 3, 1931

1,830,024

UNITED STATES PATENT OFFICE

GORDON B. GRACE AND LOUIS P. LANSING, OF SAN FRANCISCO, CALIFORNIA

MEAT BROILER

Application filed May 31, 1927. Serial No. 195,160.

This invention relates generally to cooking appliances, and particularly to appliances for broiling meat.

It is an object of this invention to devise a meat broiler which will permit the meat to be brought into relatively close searing relationship with the source of heat, and at the same time will permit the meat to be withdrawn from the source for turning.

It is a further object of this invention to devise a broiler which will be provided with a meat holder mounted in such a way that it can be moved into close searing relationship with the source of heat, and can be retracted from the source to be inverted.

It is a further object of this invention to devise an automatic type of meat broiler, in which the meat will be recurrently advanced into close searing relationship with the source of heat and withdrawn and automatically turned.

It is a further object of this invention to devise a novel timing mechanism in combination with an automatic broiler.

It is a further object of this invention to devise a broiler in which the searing relationship of the meat to the source of heat may be adjusted.

It is a further object of this invention to devise a broiler which will be provided with means for maintaining the meat in roasting relationship with the source of heat during the latter part of a cooking operation.

It is another object of this invention to devise a meat broiler which will be comparatively simple in mechanical construction, reasonably cheap to manufacture, and which may be readily kept clean when in use.

Further objects of this invention will appear from the following description in which we have set forth the preferred embodiment of our invention. It is to be understood that the appended claims are to be accorded a range of equivalents consistent with the state of the prior art.

Referring to the drawings:

Figure 1 is a front elevational view illustrating a broiler incorporating the principles of this invention.

Fig. 2 is a front elevational view of the broiler shown in Fig. 1.

Fig. 3 is a rear elevational view of the broiler shown in Fig. 1, certain parts being removed to expose the working mechanism.

Fig. 4 is a cross sectional detail showing the timing mechanism and the construction of the turning mechanism for the meat holder.

Fig. 5 is a cross sectional view taken along the line 5—5 of Fig. 4.

Fig. 6 is a cross sectional detail taken upon the line 6—6 of Fig. 4.

Fig. 7 is a cross sectional view taken along the line 7—7 of Fig. 5.

Figure 8:
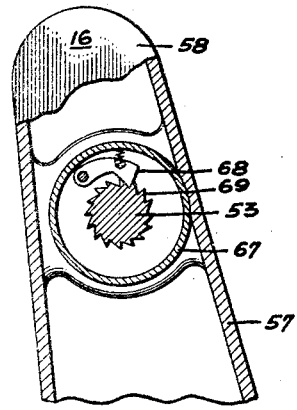
Figure 9:
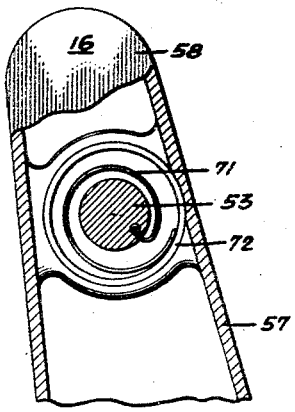

Figs. 8 and 9 are cross sectional details taken along the lines 8—8 and 9—9 respectively of Fig. 4, and showing the construction of the mechanism for turning the meat holder.

Figure 10:
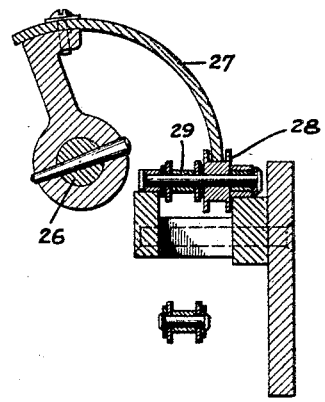

Fig. 10 is a cross sectional view taken along the line 10—10 of Fig. 3 and showing the construction of the cam mechanism for oscillating the meat supporting arms.

Figure 11:
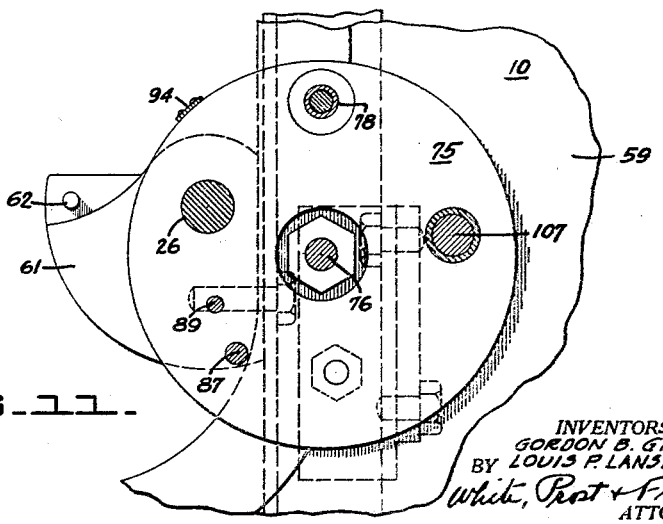

Fig. 11 is a cross sectional view taken along the line 11—11 of Fig. 4.

Fig. 12 is a plan view of the meat holding grill.

Fig. 13 is an end view of the grill shown in Fig. 12.

Fig. 14 is a cross sectional view taken along the line 14—14 of Fig. 12.

Fig. 15 is a detail illustrating the construction of one of the meat holder support arms.

This invention may be outlined briefly as comprising mechanical means whereby the meat to be broiled may be advanced into close searing relationship with a suitable source of heat and withdrawn or retracted at recurrent intervals so that it may be turned. In the preferred form of the invention, a meat holder is carried by a pair of pivotally mounted arms which are adapted to be oscillated by manual or motive means. When the arms are swung so as to move the meat holder away from the source of heat, suitable means is brought into operation to invert the meat holder so that during a subsequent searing operation, the other side of the meat is exposed to the heat. Suitable timing mechanism is provided which may be set by an operator so that after a predetermined number of oscillatory movements of the arms, the holder is retained in retracted position for removal or replacement of the meat. An adjustment is provided so that the minimum distance between the meat holder and the source of heat, and thus the searing relationship may be manually adjusted. Means is also provided so that during the latter part of the cooking operation, the meat holder is automatically maintained a greater distance away from the source of heat so that the heat has a roasting rather than a searing action during this time.

The invention as it has been illustrated in the drawings, includes a suitable housing 10, this housing including a lower horizontal portion 11 which serves as a supporting base and as a means for retaining a grease pan, and an upright portion 12 to the front side of which the heating element 13 is mounted. The construction of this heating element forms no part of this invention, and while one of the electrical type has been shown, I may also employ an element using gas or other fuel. It is preferably in the form of an upright panel and is adapted to be heated to a radiating temperature. Pivotally mounted so as to swing about an axis below the heating element 13 are the arms 15 and 16, the outer ends of which carry a suitable meat holder 17. The arm 16 is of hollow construction and carried within the same is a suitable mechanism designated generally at 18 (Figs. 3 to 5), for turning the meat holder 17 one-half revolution every time the arm 16 swings to a retracted position. The motive power for recurrently swinging the arms 16 is preferably provided by the small electric motor 19 (Fig. 3) operatively connected with the arms through suitable driving mechanism. The timing mechanism designated generally at 21 is disposed in one side of the housing and may be conveniently set by an operator so that after a certain number of swinging movements of arms 16, the meat holder will be retained away from the source of heat until released by the operator. The mechanism for determining the extent of the searing period, is designated generally at 22 and is preferably coordinated with the other mechanism so as to be automatic in its operation.

Motor drive mechanism

The inner ends of arms 15 and 16 are preferably mounted upon a shaft 26 (Figs. 3 to 5), this shaft being suitably journaled within the housing 10. Interconnecting the shaft 26 and motor 19 there is a cam mechanism including two elements, one element being the cam plate 27 (Figs. 3 and 10) and the other being the roller 28 carried by the endless chain 29. Chain 29 is entrained upon an idler sprocket 31, and a sprocket 32 which is driven by pulley wheel 33 through the worm gear drive 34. A belt 36 is trained about pulley wheel 33 and a pulley 37 upon the shaft of motor 19, so that motor 19 drives chain 29 at a greatly reduced speed. The cam plate 27 is fixed to shaft 26 and curved as shown in Fig. 10 so that cam surfaces 38 and 39 remain in contact with roller 28. As cam surface 38 rides upon roller 28 the arms 15 and 16 are swung forwardly and downwardly until roller 28 reaches the cam surface 39, after which the arms 15 and 16 are again swung into upright position. The speed of motor 19 and the speed reducing drive is such that the arms remain upright for a considerable period until they are swung downwardly by contact of cam 27 with the roller 28. The advantage of using the cam elements is that the arms 15 and 16 may be swung down at any time independently of the drive connection, and may be retained in this position while the drive connection continues to function.

Meat holder and turning mechanism

The meat holder is shown in detail in Figs. 12 to 14 inclusive and comprises a pair of grids 40 and 41 which are preferably each constructed of a frame 42 to which are secured the cross wires 43. To one side of one of the grid 41 there is fixed a pin 44 which is adapted to be journaled in the arm 15. Upon the other side of grid 41 is a pair of members 46 which are fixed to the frame 42, these members carrying projecting pins 47. Members 46 preferably form a hinge connection for adjacent edges of grids 40 and 41, and the other edges are adapted to be detachably clamped together. For example as a detachable clamping means I have shown the use of a resilient wire 48 having its one end pivotally secured to one corner of grid 40 as by means of an eyelet 49. The wire 48 is adapted to be flexed about the pin 44 and to be engaged behind a pin 50 which is likewise mounted upon grid 40. For separating the two grids in order to introduce a piece of meat, it is only necessary to disengage wire 48 from pin 50. Referring now to Fig. 4, the spaced pins 47 provided along one edge of the meat holder are adapted to be received in apertures 51 provided in a bar 52. This bar is secured to one end of a shaft 53 which is journaled within the arm 16. The arm 15 is provided with a slotted spring strip 54 as shown in Fig. 15, into which the pin 44 is adapted to engage after the pins 47 have been inserted in apertures 51. Thus the meat holder is supported so that by rotation of shaft 53, it may be rotated about an axis substantially parallel to the axis of shaft 26. Shaft 53 is extended and is provided with a handle 56 whereby the meat holder may be rotated manually.

In practice it is desirable to provide mechanical means for automatically rotating the holder one-half revolution every time the arms 15 and 16 are swung down to withdraw the meat from the source of heat. Thus the arm 16 has been shown as constructed of a hollow casting 57 (Figs. 4 and 5) which is enclosed by the side cover plate 58. As shown in Figs. 5 and 11, secured to the side wall 59 of the main housing 10, there is an arcuate projecting member 61 over which the lower end of the hollow arm 16 is adapted to fit. Pivotally secured to member 61 as by means of pin 62, there is a reciprocating rod 63 which extends outwardly within the arm 16 and which is pivotally connected to a gear rack 64. Rack 64 meshes with a pinion 66 which is journaled upon the shaft 53, and as the pivot pin 62 is eccentric with respect to shaft 26, the rack 64 is adapted to reciprocate relatively to the arm when the arm is swung downwardly, and consequently pinion 66 is rotated. A ratchet mechanism (Fig. 8) interconnects pinion 66 with shaft 53 so that either during the down or up movement of arm 16 shaft 53 is rotated approximately one-half revolution. As shown in Figs. 4 and 8, in this particular instance we have shown the use of a ratchet mechanism comprising an annular cup 67 within which is mounted the spring pressed pawl 68, this pawl engaging a toothed ratchet wheel 69 which is fixed to shaft 53. To prevent free rotation of the meat holder we preferably make use of a frictioning means, as for example a spring 71 (Figs. 4 and 9) fixed to the shaft 53 and bearing frictionally against the inner periphery of a cup 72 which in turn is fixed to the hollow casting 57. With this arrangement, when arm 16 is moved forwardly and downwardly, rotation of pinion 66 carries with it the shaft 53, and the meat holder is rotated approximately one-half revolution. When arm 16 is moved upwardly however, pawl 68 ratchets over the ratchet wheel 69 and the spring 71 prevents further rotation of shaft 53. Therefore every time the arms 15 and 16 are swung downwardly and then back up to normal position, the meat holder is rotated to bring its opposite side to face the heating element.

Timing mechanism

As has been previously explained the timing mechanism may be set by an operator so that after a predetermined number of movements of the arms 15 and 16 has occurred, these arms are retained in an out of the way position to permit the removal of the meat holder. It is possible to use a number of different timing mechanisms but we prefer to employ the mechanism as shown which comprises a cup shaped setting wheel or knob 74 (Figs. 3 to 5) which is concentrically journaled to shaft 76, this shaft also serving as a journal for certain parts of the timing mechanism to be later described. The other end of journal pin 76 is secured to the end wall of a cup shaped casing 77. The casing 77 is mounted upon a base plate 75 which is fixed to the side wall 59 of housing 10, and this casing is bodily movable relative thereto to effect a resetting of the timing mechanism preparatory to starting a new cooking operation. For example casing 77 has been shown as fixed to one end of a hollow member 78 which is journaled in the base plate 75, so that both the casing 77 and setting wheel 74, may be swung bodily a limited amount about the axis of member 78. Loosely mounted upon the journal pin 76, there is a toothed ratchet wheel 79, which is preferably spring pressed to rotate in a counterclockwise direction, as by means of a spiral spring 81, one end of which is secured to ratchet wheel 79 and the other end of which is secured to the inner face of knob 74 as by means of pin 82. Shaft 26, the rotation of which oscillates the arms 15 and 16, is extended through an elongated slot 83 and provided with a radially projecting tooth 84 which is adapted to engage and rotate the ratchet wheel 79 when the arms 15 and 16 are rotated to retracted position. A spring pressed pawl 86 normally engages the teeth of wheel 79, and prevents rotation of this ratchet wheel in a counterclockwise direction. Pawl 86 is pivotally mounted to base plate 75 as by means of pivot pin 87.

Extended through another elongated aperture in casing 77, there is a pin 89 which is mounted upon the base plate 75, and which extends adjacent to the pawl 86. In one position of casing 77 the pin 89 does not interfere with operation of the pawl 86, but in another position of the casing, pin 89 retains the pawl 86 out of engagement with the ratchet wheel 79. Carried by the ratchet wheel 79, there is a cam element 91 which in its path of movement, is adapted to engage the movable pin 92 and by movement of this pin, effect locking of the arms in retracted position. The initial position of cam element 91 is determined by the stop pin 93 which is fixed to the inner face of knob 74, so that setting of knob 74 determines the length of the arc through which cam element 91 must move before engaging and moving the pin 92. A pointer 94 (Figs. 1 and 5) is secured to the periphery of the casing 75, and the periphery of knob 74 is provided with suitable graduations or markings 96 by means of which the setting of knob 74 may be determined. The knob is retained in any one set position by means of a suitable frictioning device which operates between the journal pin 76 and the knob. One suitable form of frictioning device comprises a spring washer 97 (Figs. 4 and 7) which is clamped to the end of pin 76 by means of nut 98, and is arranged to frictionally engage the face of knob 74 within the recess 99.

As shown, there is a lever 101 fixed to shaft 26, and engaging this lever there is a tensioning spring 102 which serves to normally urge the arms 15 and 16 to an upright position. Journaled to the housing and extending thru an elongated aperture 106 in casing 77, there is a shaft 107, to one end of which is fixed the arm 108 upon which the pin 92 is mounted. The other end of shaft 107 carries a detent lever 109 which is adapted to be rocked when cam element 91 engages the pin 92. Disposed upon the end of lever 101, and pivotally secured to pin 103, there is a U-shaped latch member 111 (Figs. 4, 6 and 7), which is normally biased in a direction to engage the detent arm 109 as by means of a compression spring 112. This spring and the latch member 111 are shown in dotted lines in Fig. 6 and the latch also appears in Fig. 4. If the pin 92 is engaged by cam member 91 to rock the detent arm 109 into locking position, movement of the arms 15 and 16 to lowered position carries latch 111 above the detent arm 109, and engagement of the latch with arm 109 when arms 15 and 16 start to move upwardly effectively locks these arms in lowered position. The shaft 107 is normally biased to maintain detent arm 109 out of engaging position, as by means of a compression spring 113.

The operation of the mechanism so far described may be briefly outlined as follows: Every time the motor moves the arms 15 and 16 to retracted position, the tooth 84 upon shaft 26 engages the teeth of ratchet wheel 79 and moves this wheel up one notch, rotation of this wheel in counterclockwise direction being prevented by the pawl 86. When the cam member 91 engages pin 92, shaft 107 is rocked and detent arm 109 is moved to engage the latch member 111, thus retaining the arms 15 and 16 in lowered position. If it is desired to commence a new cooking operation the operator grasps knob 74 and shifts the casing 77 bodily toward the rear of the housing. This movement causes the disengagement of tooth 84 and pawl 86 thus releasing the ratchet wheel 79 and permitting this wheel to rotate in a counterclockwise direction to return to its original position. Shifting of casing 77 also serves to move the detent arm 109 to a position in which it disengages with latch 111, the next time cam plate 24 engages roller 28. It is to be understood that even when the arms 15 and 16 are locked in retracted position, cam plate 27 still engages roller 28 a slight amount.

*Meat holder adjustment*

For varying the cooking relationship between the meat holder and the face of the heating element 13, we have provided an adjustable bar 116 (Figs. 1, 2 and 5) against which one edge of the meat holder 17 is adapted to contact when in cooking position. Bar 116 is supported by a pair of rods 117 which have pivotal connection to the bar 116. Rods 117 extend slidably through the front 118 of housing 10, and are pivotally connected at their inner ends to an upstanding lever 119. Bar 116 is normally urged to a position adjacent to the heating element 13, as by means of a compression spring 121. Lever 119 is pivotally secured adjacent the lower portion of the housing as at 122 and is oscillated as by means of a bell crank 123, one arm of which carries a pin 124 adapted to engage the lever 119. The other arm of bell crank 123 is pivotally connected to rod 126, which is adapted to be reciprocated by oscillation of shaft 26 (Figs. 6 and 7). The lower end of rod 126 is pivotally connected to a lever 127, as by means of pin 128. Lever 127 is freely rotatable with respect to shaft 26, and pin 128 projects and abuts the upper edge of lever 101, which is fixed to shaft 26. The oscillations of shaft 26 therefore cause the reciprocation of rod 126 and cause the stop bar 116 to move outwardly and inwardly in synchronism with the movements of the arms 15 and 16. When the meat holder 17 is in searing relationship with the source of heat, it is in contact with bar 116 and this bar will have moved the inner movement of its limit.

After the searing of the meat has continued for a predetermined period, automatic means is provided for locking the stop bar 116 in an extended position so as to retain the meat holder in a roasting position.

Referring to Figs. 4 and 6, there is a toothed ratchet segment 141 journaled upon the pin 76. This segment is engaged by a spring pressed pawl 142, this pawl being pivotally mounted upon pin 87 which projects through the back plate 75. Slidably disposed within the hollow journal member 78, there is a pin 144 which is normally spring pressed to project within the casing 77, as by means of a compression spring 146. This pin is adapted to be actuated by a cam finger 147 which is fixed to the ratchet segment 141, as by means of screws or rivets 148. Also journaled upon the pin 76, there is a setting lever 149 which projects to the exterior of casing 77, and is provided with a finger-holder portion 151. To frictionally retain lever 149 in any one position and to provide an effective closure for the casing 77, lever 149 projects through a band 145 (Figs. 4 and 7) which is seated within a recess 150 provided within the periphery of casing 77. Movement of lever 149 carries with it the band 145. Suitable graduations or markings may be provided on the band for cooperating with pointer 94. A stop pin 153 is mounted upon the face of ratchet segment 141, and contacts with setting lever 149, thus serving to cause the position of the setting lever 149 to determine the limit of the counterclockwise movement of ratchet segment 141. Referring to Fig. 4, pivotally secured to the depending rod 126, there is a latch 156 which is spring pressed to a position to engage pin 144, as by means of spring 157. When the ratchet segment 141 has been brought sufficiently far to cause the cam finger 147 to engage the inner end of pin 144, this pin is moved into the path of latch 156 and retains the rod 126 in a raised position. Thus the stop bar 116 is retained in spaced relationship to the heating element and the meat holder is subsequently retained in roasting rather than searing position. By varying the setting of the lever 149, an operator may vary the period of time during which the meat is seared and likewise the length of time during which the roasting operation is continued. In order to prevent the segment 141 from being notched so far as to disengage it from the pawl 142, segment 141 is provided with a space 160, formed by the omission of a ratchet tooth. When the notching tooth 84 reaches this space, further notching movement is prevented. Pawl 142 is provided with double engaging teeth so as to bridge space 160.

Manual means is also provided for effecting an adjustment of the cooking relationship of the holder with respect to the source of heat. For example we have shown the bell crank 123 pivotally mounted upon a crank 129 carried by shaft 131. Shaft 131 is journaled to the housing 10 and extends thru the side wall 59, and is provided with a hand control crank 132. By changing the setting of crank 132, the pivotal axis of bell crank 123 is shifted and the movement of stop bar 116 is likewise varied. After bar 116 has been locked in roasting position by the mechanism previously described, adjustment of crank 132 serves to adjust its position with respect to the heating element and thus to adjust the roasting relationship of the meat holder. By properly proportioning the parts, both the searing and roasting positions of the stop bar 116 may be adjusted by movement of crank 132.

In operating the device, the meat is retained within the holder and the arms 15 and 16 permitted to retain an upright position by shifting knob 74 and casing 77 rearwardly. This movement of knob 74 disengages both pawls 86 and 142 from ratchet wheel 79 and ratchet segment 141 respectively, and likewise disengages tooth 84 from these members. Both ratchet wheel 79 and ratchet segment 141 are therefore free to return to their original positions under the tensions of spring 81, and the tension of spring 159 which is applied to the segment 141. Spring 159 likewise serves to urge the entire casing toward normal operating position. The motor by rotation of chain 29 periodically swings the arms 15 and 16 downwardly and then returns them to normal upright position. This swinging movement of the arms causes the meat holder 17 to be inverted or rotated one-half revolution by virtue of the mechanism 18 previously described. For every movement of the arms 15 and 16, the tooth 84 engages and moves up ratchet wheel 79 one notch, and likewise notches of the ratchet segment 141. After a certain number of movements of the arms 15 and 16, depending upon the setting of lever 149, the cam finger 147 engages pin 144 and slides this pin into the path of movement of latch 156. Previous to this the stop bar 116 has been oscillating in front of the heating element 13, but with the arms 15 and 16 in upright position, has permitted the meat holder 17 to be in searing relationship to the source of heat. However after engagement of latch 156 by pin 144, stop bar 116 is positioned so as to retain the holder 17 in a meat roasting position. As the cooking operation continues, cam member 91 finally engages the pin 92 and the detent arm 109 is moved into the path of latch 111. The next time the arms 15 and 16 are swung downwardly, latch 111 engages detent arm 109 and retains the arms 15 and 16 in this lowered position where the meat holder 17 may be conveniently removed for replacement of the meat.

One of the most important features of this invention is the fact that the meat is brought into close searing relationship with the source of heat. Thus immediately at the beginning of a cooking operation, the cells of the meat are seared or closed and all of the natural juices are retained. Burning of the meat during the latter part of a cooking operation is prevented by retaining the same in roasting relationship.

We claim:

1. In a food cooker, means forming a source of heat, a pair of pivotally mounted arms, a food holder pivotally carried by said arms to one side of said source, means for recurrently swinging said arms to withdraw the holder and to advance the same towards the source of heat, and timing means adapted to lock said arms in withdrawn position after a predetermined number of recurrent movements.

2. In a food cooker a pair of pivotally mounted arms, a food holder carried by said arms, and motor and cam means for effecting swinging movement of said arms by said motor.

3. In a food cooker a pair of pivotally mounted arms, a food holder carried by said arms, a motor, cam means including two elements for effecting recurrent swinging movement of said arms, one of said cam members being operably connected with said arms, and means for driving the other of said elements by said motor.

4. In a food cooker, means forming a source of heat, a food holder, means for bringing said holder into searing relationship to said source, means for recurrently withdrawing the holder and inverting the same, a stop for limiting movement of the holder towards said source, and means for automatically adjusting said stop to retain the holder a greater distance from said source toward the end of a broiling operation.

5. In a food cooker, means forming a source of heat, a food holder, means for bringing said holder into searing relationship to said source, means for recurrently withdrawing the holder and inverting the same, a stop for limiting movement of the holder towards said source, and means for automatically adjusting said stop after a predetermined number of recurrent withdrawing movements to retain the holder a greater distance from the source.

6. In a food cooker, a food holder, a source of heat, means for recurrently advancing and retracting said holder from the source of heat, means for determining the extent of a cooking operation comprising a member adapted to be progressively moved in one direction, means actuated by movement of said member for locking said holder in retracted position, and means for effecting return of said member to an initial position at the commencement of a new cooking operation.

7. In a food cooker, a food holder, a source of heat, means for recurrently advancing and retracting said holder from the source of heat, means for determining the extent of a cooking operation comprising a member adapted to be progressively moved in one direction, means actuated by movement of said member for locking said holder in retracted position, and means having a common operating element for effecting return of said member to an initial position and for effecting unlocking of said meat holder.

8. A cooking device comprising a heating element, means movable to hold an article of food in cooking position with reference to the heating element, and to withdraw and turn the food, a timing mechanism, and a power operable mechanism interposed between and connected with the timing mechanism and the food moving means, for causing said means respectively to hold the food in cooking position, turn the food, again hold the food in cooking position and finally withdraw the food after cooking.

9. A cooking device comprising a heating element, means movable to hold an article of food in cooking position with reference to the heating element, and to withdraw and turn the food, power operable mechanism cooperably associated with said means to cause the same to cyclically hold the food in cooking position, withdraw and turn the food, and again hold the food in cooking position, and timing means for automatically causing said first means to retain the food in a withdrawn position after a predetermined period of time.

10. In a food cooker, means forming a source of heat, a food holder, means for recurrently advancing and withdrawing said holder from said source during a cooking operation, and means capable of being rendered ineffective for a predetermined period of time for locking said holder in retracted position.

11. In a food cooker, means forming a source of heat, a pair of pivotally mounted arms, a food holder pivotally carried by said arms to one side of said source, means for recurrently swinging said arms to withdraw the holder and to advance the same towards the source of heat, and timing means adapted to lock said arms in withdrawn position after a predetermined period of time.

12. In a food cooker, means forming a source of heat, a pair of pivotally mounted arms, a food holder pivotally carried by said arms to one side of said source, means for recurrently swinging said arms to withdraw the holder and to advance the same toward the source of heat, means effective during swinging movement of the arms to invert the holder, and timing means adapted to lock said arms in withdrawn position.

In testimony whereof, we have hereunto set our hands.
GORDON B. GRACE.
LOUIS P. LANSING.